(12) United States Patent
Lin et al.

(10) Patent No.: US 12,021,564 B1
(45) Date of Patent: Jun. 25, 2024

(54) COMPACT TUNABLE OPTICAL TIME DELAY

(71) Applicant: Lightel Technologies, Inc., Renton, WA (US)

(72) Inventors: Shyh-Chung Lin, Renton, WA (US); Hongyu Hu, Renton, WA (US); Yong Mao, Renton, WA (US)

(73) Assignee: Lightel Technologies, Inc., Renton, WA (US)

( * ) Notice: Subject to any disclaimer, the term of this patent is extended or adjusted under 35 U.S.C. 154(b) by 87 days.

(21) Appl. No.: 18/080,580

(22) Filed: Dec. 13, 2022

(51) Int. Cl.
*H04B 10/516* (2013.01)
*H04B 10/40* (2013.01)

(52) U.S. Cl.
CPC .......... *H04B 10/516* (2013.01); *H04B 10/40* (2013.01)

(58) Field of Classification Search
CPC ..... H04B 10/516; H04B 10/40; G02B 6/2861
See application file for complete search history.

(56) References Cited

U.S. PATENT DOCUMENTS 5,066,088 A * 11/1991 Davies ............... G02B 6/29395
385/27
6,147,799 A * 11/2000 MacDonald ........... G02B 26/06
359/857
6,392,807 B1 * 5/2002 Barbarossa ........ G02B 6/29395
359/615
6,751,374 B2 * 6/2004 Wu ........................ G02B 6/264
385/47

FOREIGN PATENT DOCUMENTS

CN          113589436 A    * 11/2021
CN          113900188 A    *  1/2022
CN          217932169 U    * 11/2022

* cited by examiner

*Primary Examiner* — Pranesh K Barua
(74) *Attorney, Agent, or Firm* — Han IP PLLC; Andy M. Han

(57) ABSTRACT

A compact tunable optical true time delay consists of an optical subassembly to apply dispersion-free time delay to the input optical signal, and a mechanical subassembly to facilitate tuning the delay using a linear actuator. The deployment of a precision optical ferrule sliding in a precision split sleeve offers a self-contained and inexpensive method to minimize optical misalignment during the tuning process, which releases the burden of the mechanical subassembly and is also advantageous in keeping the device compact. The exterior dimension remains unchanged at any moment despite the interior motion. Both reflection-type and transmission-type optical time delays are introduced, driven either manually or electrically.

26 Claims, 6 Drawing Sheets

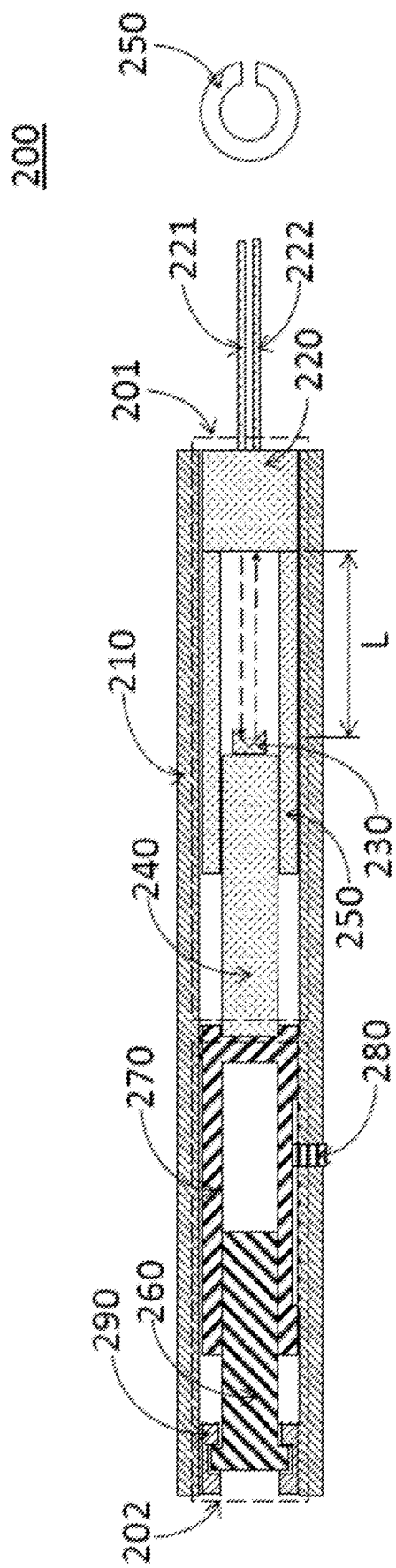
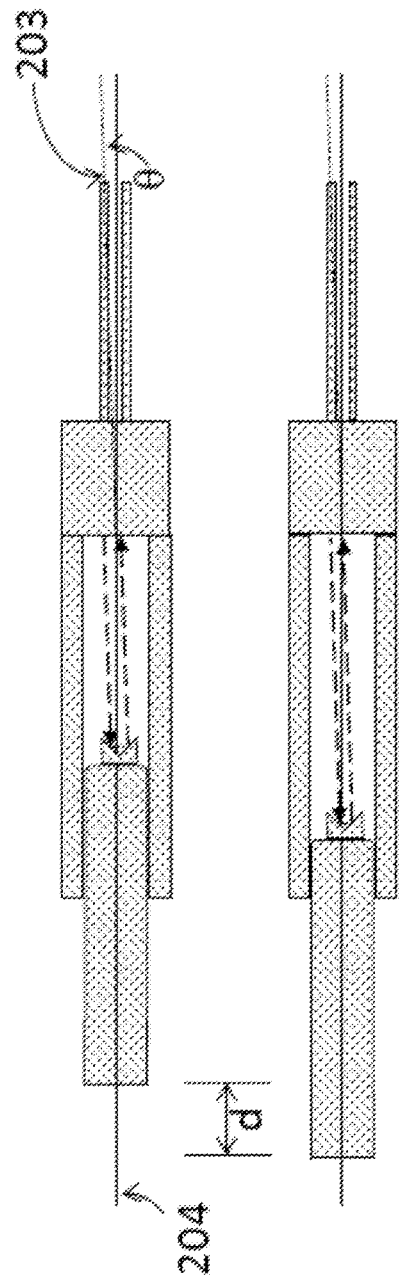
FIG. 2A
FIG. 2B

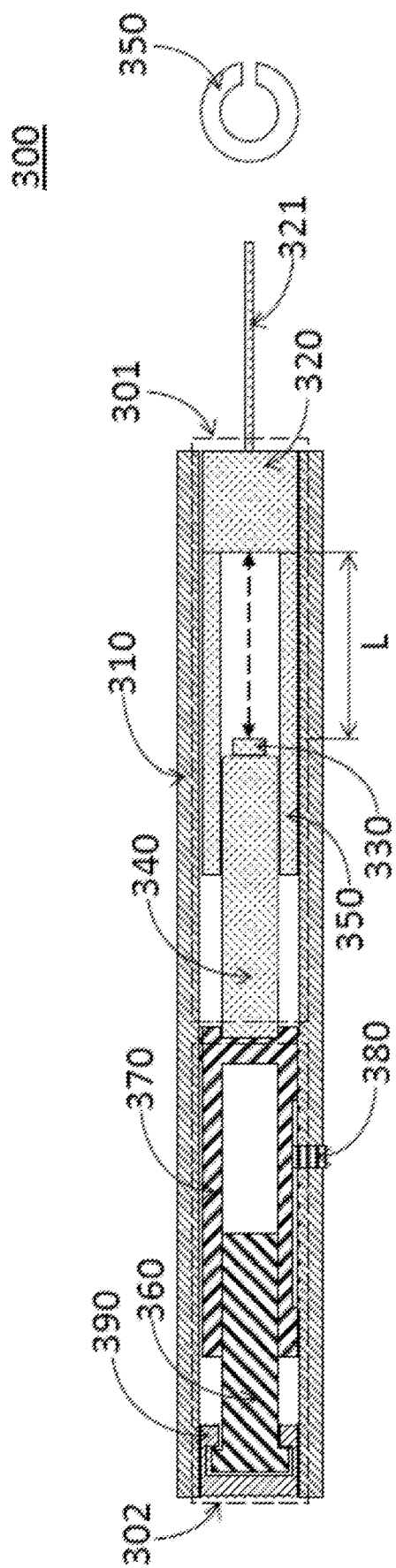
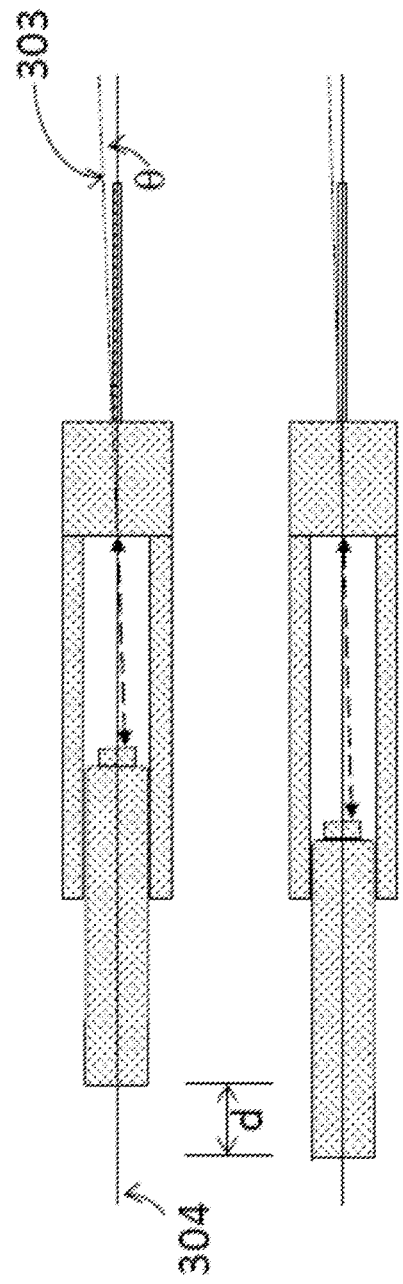
FIG. 3A
FIG. 3B

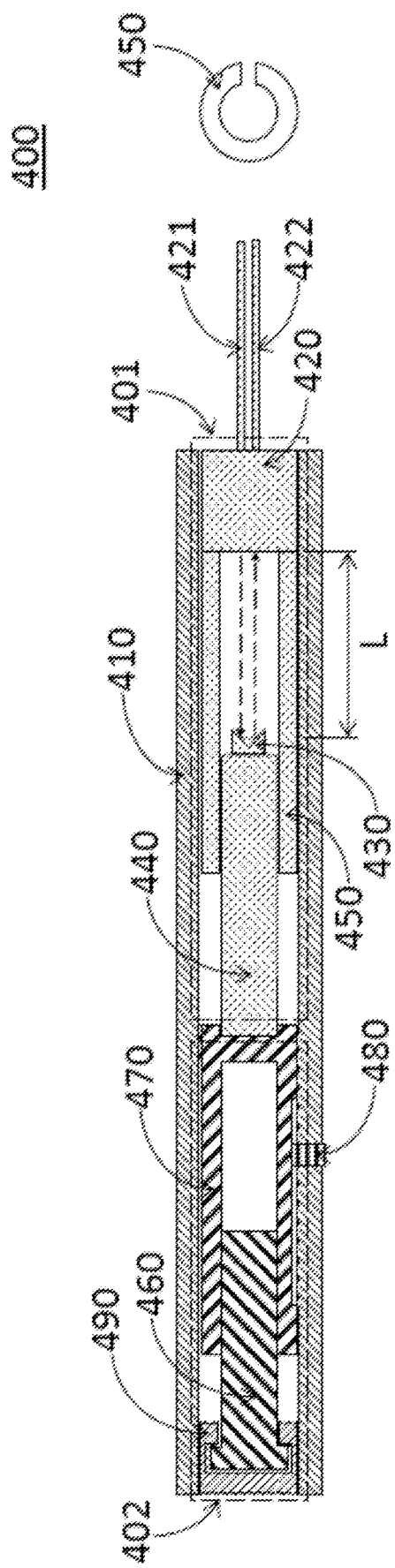
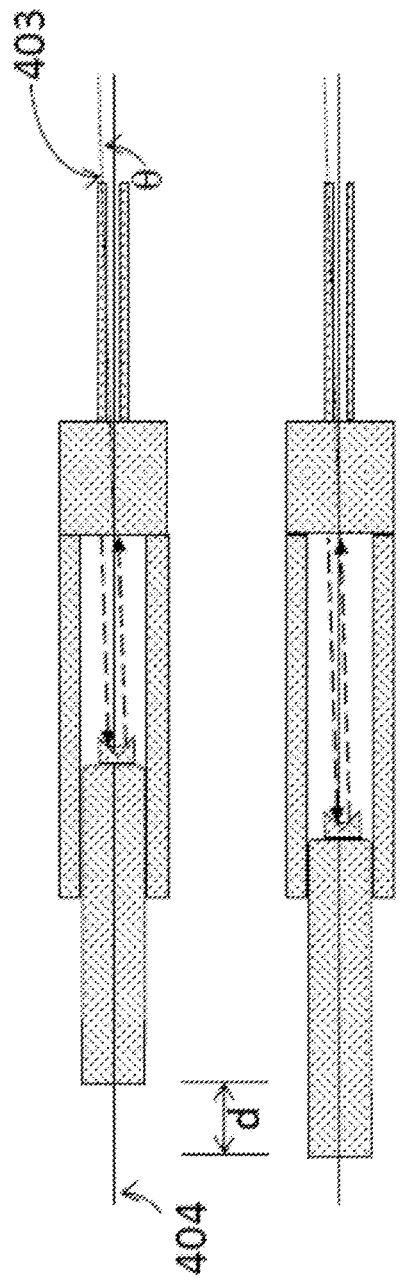
FIG. 4A
FIG. 4B

COMPACT TUNABLE OPTICAL TIME DELAY

BACKGROUND

Technical Field

The present invention generally relates to optical signal processing devices, and more specifically, to a tunable optical true time delay in optical signal processing devices.

Background of the Invention

An optical time delay, which postpones an optical signal by a certain amount of time, is an important device widely used in a lot of optical equipment and systems. For example, in a fiber-optic communication system implementing time-division multiplexing (TDM), optical time delays are needed to interleave and allocate different data channels into distinct time slots, so they can be combined and carried by a single optical fiber. Another application is optical coherence tomography (OCT) which is a technique to build a sensor that can provide high-resolution imaging for optical scattering samples (e.g., biological tissues) without contact. Typically, OCT leverages the principle of Michelson interferometer and substitutes the mirror in one arm with the samples to be discovered. A tunable optical time delay is then embedded in the reference arm so the sample can be scanned along the depth. Optical time delay is also a critical part in an autocorrelator, which is continuously tuned to determine the pulse width produced from a modulated laser. Usually, it is beneficial that the device offers true time delay which is independent of the optical frequency.

There exist different types of optical time delays. A reflection-type device has a single port acting as both input and output simultaneously, with the processed optical signal sent back to where it was launched in. On the contrary, a transmission-type optical time delay has separate input and output ports. Considering the applications described above, reflection-type is more suitable for optical coherence tomography and transmission-type is a better fit for time-division multiplexing. Variable optical time delays operate either manually or automatically with a transducer.

A tunable optical time delay commonly uses some kind of actuator (e.g., a micrometer stage) to manipulate the delay. However, the requirement of maintaining optical alignment at micron level is a great challenge and usually leads to a solution deploying ultra-precision, bulky and expensive components. Besides, it can cost a lot of effort to install, maintain and operate such device. These drawbacks limit the feasibility of tunable optical time delays. Therefore, it is an objective of the present invention to propose a tunable optical true time delay with a compact and self-contained design which particularly resolves the optical alignment problem effectively and efficiently.

SUMMARY

An optical time delay is constructed as a combination of an optical subassembly and a mechanical subassembly. The optical subassembly comprises an optical collimator, a reflector, a precision optical ferrule and a precision split sleeve. The mechanical subassembly, which may be implemented by a type of a linear actuator, comprises a screw, a sliding barrel with inner threads, a pin and a position clamp. The sliding barrel, precision optical ferrule and reflector are integrated and move jointly.

In one aspect, the configuration of the optical subassembly is arranged such that an input beam of light propagates certain distance in space along the optical axis, in accordance with the time duration it's delayed. The reflector helps direct the beam towards designated output port.

In the second aspect, the configuration of the mechanical subassembly is arranged such that when the screw is rotated relative to the barrel, the existence of the pin and position clamp forces the barrel to undergo linear motion along the mechanical axis which squeezes or extracts the optical path length and hence the delay time.

In the third aspect, precise optical alignment is maintained effectively by the design of the optical subassembly itself with the precision optical ferrule sliding within the precision split sleeve, which ensures that the orientation of optical components is held firmly. The only task of the mechanical subassembly is thus to drive the motion which makes the device compact and inexpensive.

In the fourth aspect, as another advantage of the design, the effective length of the device is determined by the spanning from the screw to the optical collimator, which remains constant during delay time tuning.

In the fifth aspect, as another advantage of the design, the optical axis does not necessarily align with the mechanical axis, which provides ease of assembly.

In one embodiment, a reflection-type manual variable optical time delay contains a single terminal for the input optical signal to enter the device and for the delayed optical signal to exit as well.

In the other embodiment, a 1×1 transmission-type manual variable optical time delay contains distinct terminals for the input and output optical signals respectively.

In another embodiment, a reflection-type motorized variable optical time delay is realized by using an electrically controlled transducer, such as a motor, to drive the screw.

In yet another embodiment, a 1×1 transmission-type motorized variable optical time delay is realized by using an electrically controlled transducer, such as a motor, to drive the screw.

Various embodiments are disclosed below, with reference to the attached figures to provide better understanding of the principles and benefits of present invention.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

FIG. 2A and FIG. 2B are diagrams showing configuration and beam propagation within a 1×1 transmission-type manual optical time delay with tuning mechanism in accordance with the other embodiment of the present disclosure.

FIG. 3A and FIG. 3B are diagrams showing configuration and beam propagation within a reflection-type motorized optical time delay with tuning mechanism in accordance with another embodiment of the present disclosure.

FIG. 4A and FIG. 4B are diagrams showing configuration and beam propagation within a 1×1 transmission-type motorized optical time delay with tuning mechanism in accordance with yet another embodiment of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration.

Various proposed designs, schemes, and embodiments in accordance with the present disclosure of a compact optical device, which creates manageable true time delay driven by movable mechanical components while holding precise optical alignment, are described in detail below. Fundamentally, this is achieved by the utilization of a precision optical ferrule sliding within a precision split sleeve, which enables stable alignment of optical components while moving.

The following provides a description of the working principle of the designed variable optical time delay, which is divided into an optical portion and a mechanical portion. The role of the optical portion is to generate time delay for the input optical signal, which is adjustable with the aid of the mechanical portion, without compromising optical alignment.

In the optical portion, initially an incoming light beam is collimated by an optical collimator, which then propagates towards a reflector where the beam is reflected back and guided to the output through the optical collimator. The optical signal is therefore delayed by the round-trip time it travels between the collimator and the reflector. Meanwhile, to tune the delay, the reflector is affixed to the tip of a precision optical ferrule, which is in turn connected to one end of a sliding barrel in the mechanical portion. The other end of the sliding barrel is threaded onto a screw. The screw is fixed in place by a position clamp and a pin prevents the sliding barrel from rotating. When the screw is turned, the barrel translates along the screw to trigger the motion of the reflector/optical ferrule assembly, and the optical path length between the collimator and the reflector is adjusted accordingly to vary the time delay.

During the tuning process, the optical portion maintains alignment by itself via a precision split sleeve and a precision optical ferrule. The precision optical ferrule with the reflector attached to its end face fits and slides in the precision split sleeve, and the emerging elastic force between them helps the sleeve to hold the ferrule tightly in spite of the motion. Consequently, optical alignment is maintained in the optical portion in a self-contained manner, and the burden of the mechanical portion to use high-precision components is thus relieved. The total length of this tunable optical time delay is confined from the screw to the optical collimator, which stays the same at any time since none of these two components possess translational motion. It's also advantageous that the axis of mechanical translation and the axis of optical beam propagation do not have to align in line.

Figure 1A:
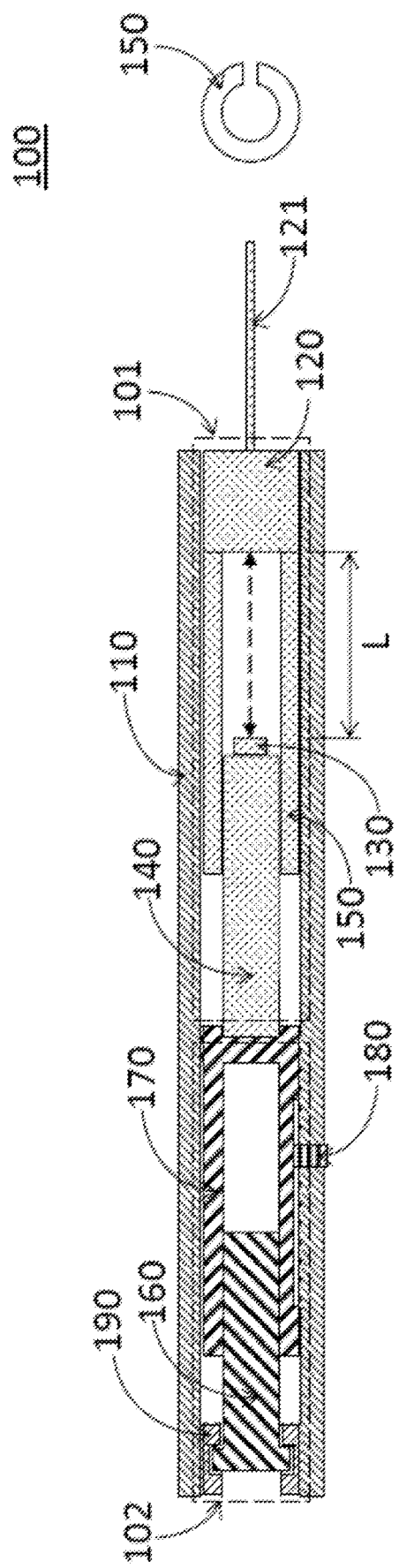
FIG. 1A and FIG. 1B are diagrams showing configuration and beam propagation within a reflection-type manual optical time delay with tuning mechanism in accordance with one embodiment of the present disclosure.
Figure 1B:
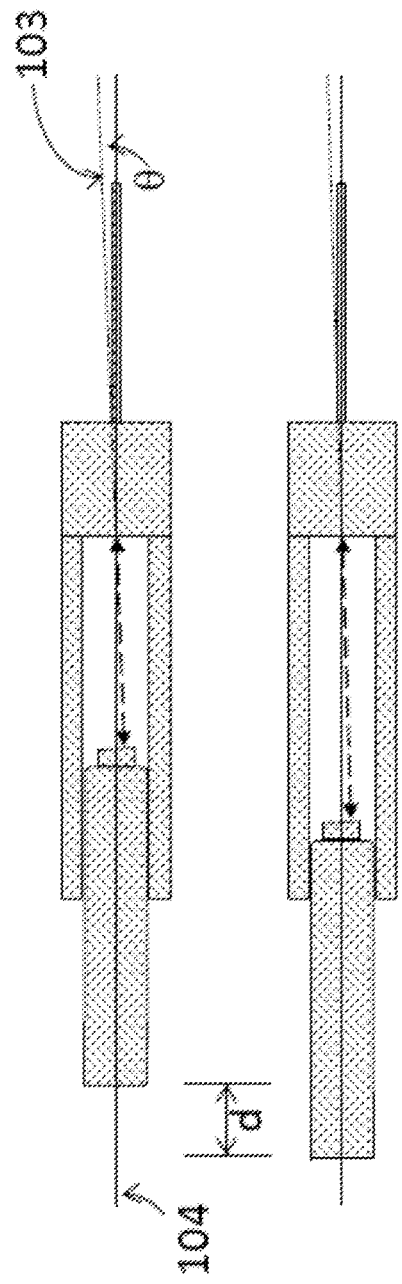

One embodiment of the tunable optical time delay is shown in FIG. 1A and FIG. 1B. A manual reflection-type fiber-optic time delay device 100 is composed of an optical subassembly 101 and a mechanical subassembly 102 enclosed within a main housing 110. The optical subassembly 101 comprises an optical collimator 120 having an optical fiber pigtail 121, an optical reflector 130, a precision optical ferrule 140, and a precision split sleeve 150. The mechanical subassembly 102 includes a screw 160, a sliding barrel 170, a pin 180, and a position clamp 190.

The optical collimator 120 comprises a lens to collimate the input divergent light beam emerging from the optical fiber 121. Examples of lens include convex lens and gradient-index lens. Meanwhile, in the opposite direction the optical collimator 120 also captures returned collimated light beam and couples it into the optical fiber 121 as output. The optical collimator 120 is bonded to the interior of the main housing 110 and located at the edge of the device 100.

The optical reflector 130 is capable of reflecting a collimated beam of light back 180 degrees towards its source when the surface is struck by the beam normally, i.e., the angle of incidence is 0. In general, a reflector is made by applying optical coatings onto a flat substrate. Examples of coating materials include, but are not limited to, aluminum, silver, gold, and a number of dielectric materials.

The precision optical ferrule 140 and precision split sleeve 150 have been extensively used in fiber-optic industry with sub-micron accuracy in diameter and concentricity. They are preferably made of ceramic (especially zirconia), but other materials such as plastic and metal may also be used. The diameter is typically at a millimeter level, for instance, 2.5 mm and 1.25 mm are two of the standard ferrule diameters in the market. The precision optical ferrule 140 is a cylindrical stick with the optical reflector 130 attached to the flat end face at one side. The C-shaped precision split sleeve 150 is a tube coming with an opening slit which allows it to expand, so the precision optical ferrule 140 can be slidably received although the nominal inner diameter of the sleeve is slightly smaller than the outer diameter of the ferrule. The precision split sleeve 150 is bonded to the optical collimator 120 at the edge.

The sliding barrel 170 has thread pitches on the inner surface to match that of the screw 160 coming inwards from one end. The other end is joined with the precision optical ferrule 140 by crimping or other suitable techniques so they can move together. The pin 180 is inserted through the main housing 110 and fits into a slit on the outer surface of the barrel 170, which aims to prevent them from rotating relative to each other. As a result, the motion of the barrel 170 is restricted to translation inside the housing 110 with the range determined by the length of the slit. The position clamp 190 secured onto the main housing 110 at the other edge opposing the optical collimator 120 is installed to hold the screw 160 in place. A variety of mechanical fasteners can serve as the position clamp alternatively such as C-clips and E-clips. Therefore, in contrast to the sliding barrel 170, the screw 160 is rotatable, whereas forward and backward translational movements are obstructed.

Referring to FIG. 1A, an input optical signal is launched into the device 100 via the fiber pigtail 121. It's firstly converted into a collimated beam through the optical collimator 120, and then propagates a certain distance L in free space before reaching the optical reflector 130 at an angle of incidence equal to zero. The whole light beam is reflected back thereafter and travels the same distance L along reversed direction towards the optical collimator 120. Eventually, the returned beam of light is coupled into the optical fiber 121 as output. In this way, compared to the input, the output optical signal is delayed primarily by duration of 2L/v, where v is the speed at which light travels through the free space medium. It can be seen that the delay time is a function of L, namely the spacing between the optical collimator 120 and the optical reflector 130. Additionally, it yields a "true" time delay without chromatic dispersion, given that ideally the free space is vacuum and the delay time does not depend on optical frequency.

The mechanical subassembly 102 comes into play to make the spacing L tunable. When turning the screw 160 from the head, it starts to rotate relative to the barrel 170 which is threaded onto it, as the barrel is prohibited from rotating together due to the inserted pin 180. This leads to translation between these two components, and since the screw 160 has been locked in place by the position clamp 190, instead it is the barrel 170 who is forced to slide at a rate determined by the thread pitch as well as the turning speed. The precision optical ferrule 140 and optical reflector 130 are thus displaced jointly to increase or decrease the spacing L depending on whether the screw is rotated clockwise or counterclockwise. In summary, the optical time delay 100 can be tuned via rotating the screw 160 from one end of the device.

The key to maintain optical alignment and minimize optical loss while time delay is varying lies in the usage of the precision optical ferrule 140 and precision split sleeve 150 contained in the optical subassembly 101. Due to manufacturing tolerances which more or less leave a gap between the barrel 170 and the inner wall of the main housing 110, the barrel 170 tends to drift sideways and tilt while sliding. As a result, without the precision optical ferrule 140, the reflector 130 will not move perfectly along a fixed axial direction and the beam's propagation will start to deviate after reflection. For this reason, if optical alignment relies on the mechanical components, strict requirements have to be imposed on the dimensional tolerances in order to keep misalignment acceptably small, which is difficult and costly to achieve. Introducing the precision optical ferrule 140 and precision split sleeve 150 resolves this issue. During the tuning process, the precision optical ferrule 140 slides back and forth within the precision split sleeve 150. As mentioned above, the precision split sleeve 150 is gently enlarged, and the inner wall is elastically deformed. The deformation in turn produces an opposing compressive force against the precision optical ferrule 140, holding it firmly in place despite the movement. Additionally, the precision optical ferrule 140 and precision split sleeve 150 are commercially available with low price and sub-micron precision, which have been massively deployed to support the connection of optical fibers with high stability, reliability and durability. This enables a robust and cost-efficient way to maintain alignment among the optical components. Furthermore, considering their typical dimensions, it's possible to make the entire device compact at millimeter-scale. Therefore, the function of maintaining optical alignment is self-contained in the optical subassembly 101, and the task of the mechanical subassembly 102 becomes driving the translational motion only.

It should be noted that the effective exterior dimension of the device remains unaltered during tuning process. With the above design, the total length enclosing all the operating components spans from the screw 160 to the optical collimator 120, both of which are fixed at particular positions regardless of how the barrel 170, precision optical ferrule 140 and optical reflector 130 move in between. This makes the proposed device differ from many others wherein the entire space necessarily occupied expands to yield more time delay. Therefore, an advantage of the present invention is that it provides a compact and yet constant dimension, with driving force applied at a fixed location (i.e., head of the screw 160) to adjust delay time.

Another feature of the present design is that it's not mandatory for the optical axis and the mechanical axis to align with each other. As illustrated in FIG. 1B, the light beam propagates along the direction parallel to the optical axis 103, while the precision optical ferrule and optical reflector translate along the mechanical axis 104. The optical axis 103 makes an angle of θ to the mechanical axis 104 which is possibly non-zero. When delay time is being adjusted to different values, as demonstrated in FIG. 1B, translational displacement does not change angular orientation of the components, and consequently, the incident angle of the light beam on the optical reflector is preserved at zero. As long as the beam arrives within the clear aperture of the optical reflector, the device still works without performance degradation. Note that in this situation, a translational displacement of d along the mechanical axis 104 will cause a change in the optical path length of 2d/cosθ, which approximates to 2d if the angle θ is negligible. In practice, this feature greatly facilitates production of the device since generally the optical portion and mechanical portion are assembled in separate stages, and some uncontrollable situations could occur, such as an inclined reflector after being affixed to the ferrule tip, or a tilted beam emerging from the collimator. In this case, it might be overly challenging to ensure their axes are mutually aligned.

A second embodiment of the tunable optical time delay is shown in FIG. 2A and FIG. 2B. A 1×1 transmission-type manual fiber-optic time delay device 200 is composed of an optical subassembly 201 and a mechanical subassembly 202 enclosed within a main housing 210. The optical subassembly 201 comprises an optical collimator 220 having a first optical fiber pigtail 221 and a second optical fiber pigtail 222, an optical retroreflector 230, a precision optical ferrule 240, and a precision split sleeve 250. The mechanical subassembly 202 includes a screw 260, a sliding barrel 270, a pin 280, and a position clamp 290.

Figure 5A:
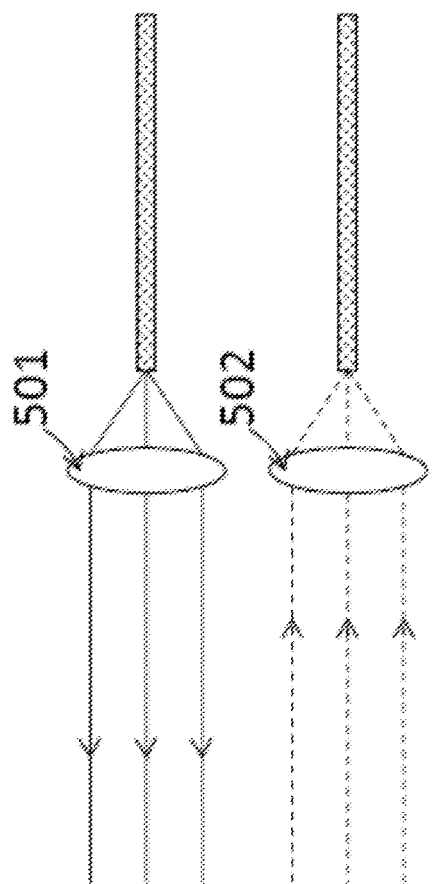
FIG. 5A and FIG. 5B are diagrams showing detailed structures of an optical collimator with two fiber pigtails where the emitted and received collimated beams are parallel to each other.
Figure 5B:
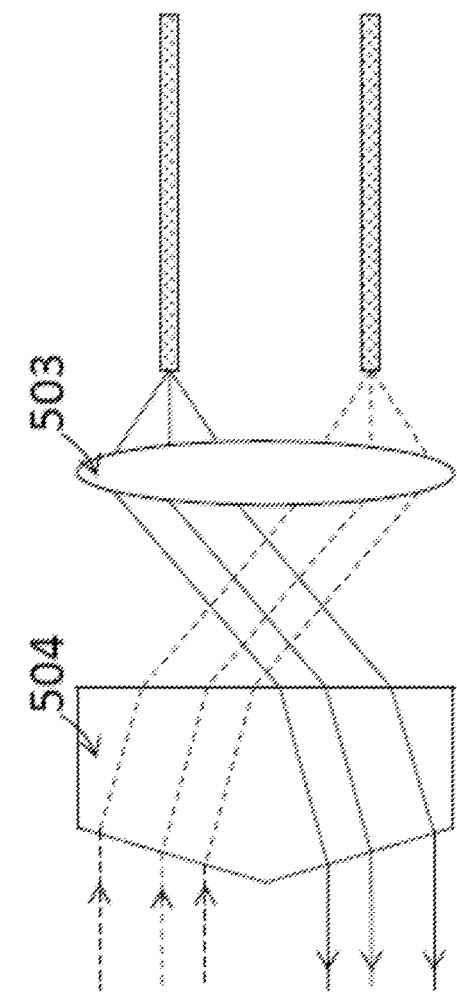

The optical collimator 220 comprises a lens to collimate the input divergent light beam emerging from the first optical fiber 221. In the opposite direction, the optical collimator 220 also uses a lens to capture a returned collimated light beam and couple it into the second optical fiber 222 as output. Examples of lens include convex lens and gradient-index lens. Additionally, the emitted beam from the first optical fiber 221 and the received beam into the second optical fiber 222 are parallel, which can be accomplished with various optical setups. In one example illustrated in FIG. 5A, two individual lenses 501 and 502 are assigned to each optical fiber. In another configuration illustrated in FIG. 5B, the two optical fibers share the same collimating lens 503 followed by a customized roof prism 504 for beam steering. The optical collimator 220 is bonded to the interior of the main housing 210 and located at the edge of the device 200.

Figure 6:
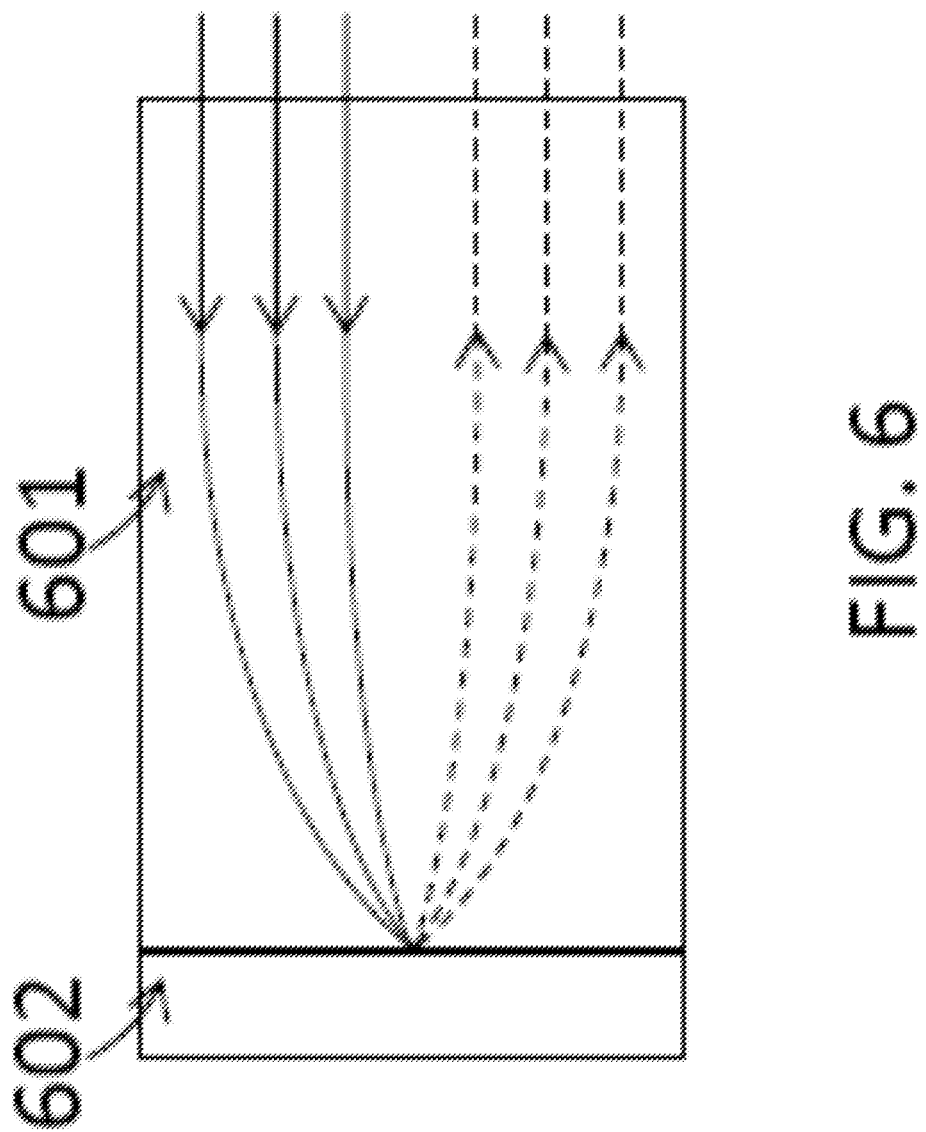
FIG. 6 is a diagram of a retroreflector in accordance with an embodiment of the present disclosure.

The optical retroreflector 230 is capable of reflecting a collimated beam of light back 180 degrees towards its original direction but along a different path. Unlike a planar mirror, sometimes a retroreflector works at a wide range of incident angles rather than just exactly zero. A variety of designs and structures are available such as hollow roof mirrors, hollow cone mirrors and corner cube prisms. Alternatively, as shown in FIG. 6, the retroreflector can be constructed using a lens 601, which focuses the incident beam onto an optical mirror 602 to reflect the light. Examples of lens are gradient index lens and C-lens. In general, a retroreflector is made by applying optical coatings onto its surfaces, with the materials include, but are not limited to, aluminum, silver, gold, and a number of dielectric materials.

The precision optical ferrule 240 and precision split sleeve 250 have been extensively used in fiber-optic industry with sub-micron accuracy in diameter and concentricity. They are preferably made of ceramic (especially zirconia), but other materials such as plastic and metal may also be used. The diameter is typically at a millimeter level, for instance, 2.5 mm and 1.25 mm are two of the standard ferrule diameters in the market. The precision optical ferrule 240 is a cylindrical stick with the optical retroreflector 230 attached to the flat end face at one side. The C-shaped precision split sleeve 250 is a tube coming with an opening slit which allows it to expand, so the precision optical ferrule 240 can be slidably received although the nominal inner diameter of the sleeve is slightly smaller than the outer diameter of the ferrule. The precision split sleeve 250 is bonded to the optical collimator 220 at the edge.

The sliding barrel 270 has thread pitches on the inner surface to match that of the screw 260 coming inwards from one end. The other end is joined with the precision optical ferrule 240 by crimping or other suitable techniques so they can move together. The pin 280 is inserted through the main housing 210 and fits into a slit on the outer surface of the barrel 270, which aims to prevent them from rotating relative to each other. As a result, the motion of the barrel 270 is restricted to translation inside the housing 210 with the range determined by the length of the slit. The position clamp 290 secured onto the main housing 210 at the other edge opposing the optical collimator 220 is installed to hold the screw 260 in place. A variety of mechanical fasteners can serve as the position clamp alternatively such as C-clips and E-clips. Therefore, in contrast to the sliding barrel 270, the screw 260 is rotatable, whereas forward and backward translational movements are obstructed.

Referring to FIG. 2A, an input optical signal is launched into the device 200 via the first fiber pigtail 221. It's firstly converted into a collimated beam through the optical collimator 220, and then propagates a certain distance L in free space before reaching the optical retroreflector 230. The whole light beam is reflected back thereafter and travels the same distance L along reversed direction towards the optical collimator 220. Eventually, the returned beam of light is coupled into the second optical fiber 222 as output. In this way, compared to the input, the output optical signal is delayed primarily by duration of 2L/v, where v is the speed at which light travels through the free space medium. It can be seen that the delay time is a function of L, namely the spacing between the optical collimator 220 and the optical retroreflector 230. Additionally, it yields a "true" time delay without chromatic dispersion, given that ideally the free space is vacuum and the delay time does not depend on optical frequency.

The mechanical subassembly 202 comes into play to make the spacing L tunable. When turning the screw 260 from the head, it starts to rotate relative to the barrel 270 which is threaded onto it, as the barrel is prohibited from rotating together due to the inserted pin 280. This leads to translation between these two components, and since the screw 260 has been locked in place by the position clamp 290, instead it is the barrel 270 who is forced to slide at a rate determined by the thread pitch as well as the turning speed. The precision optical ferrule 240 and optical retroreflector 230 are thus displaced jointly to increase or decrease the spacing L depending on whether the screw is rotated clockwise or counterclockwise. In summary, the optical time delay can be tuned via rotating the screw 260 from one end of the device.

The key to maintain optical alignment and minimize optical loss while time delay is varying lies in the usage of the precision optical ferrule 240 and precision split sleeve 250 contained in the optical subassembly 201. Due to manufacturing tolerances which more or less leave a gap between the barrel 270 and the inner wall of the main housing 210, the barrel 270 tends to drift sideways and tilt while sliding. As a result, without the precision optical ferrule 240, the retroreflector 230 will not move perfectly along a fixed axial direction and the beam's propagation will start to deviate after reflection. For this reason, if optical alignment relies on the mechanical components, strict requirements have to be imposed on the dimensional tolerances in order to keep misalignment acceptably small, which is difficult and costly to achieve. Introducing the precision optical ferrule 240 and precision split sleeve 250 resolves this issue. During the tuning process, the precision optical ferrule 240 slides back and forth within the precision split sleeve 250. As mentioned above, the precision split sleeve 250 is gently enlarged, and the inner wall is elastically deformed. The deformation in turn produces an opposing compressive force against the precision optical ferrule 240, holding it firmly in place despite the movement. Additionally, the precision optical ferrule 240 and precision split sleeve 250 are commercially available with low price and sub-micron precision, which have been massively deployed to support the connection of optical fibers with high stability, reliability and durability. This enables a robust and cost-efficient way to maintain alignment among the optical components. Furthermore, considering their typical dimensions, it's possible to make the entire device compact at millimeter-scale. Therefore, the function of maintaining optical alignment is self-contained in the optical subassembly 201, and the task of the mechanical subassembly 202 becomes driving the translational motion only.

It should be noted that the effective exterior dimension of the device remains unaltered during tuning process. With the above design, the total length enclosing all the operating components spans from the screw 260 to the optical collimator 220, both of which are fixed at particular positions regardless of how the barrel 270, precision optical ferrule 240 and optical retroreflector 230 move in between. This makes the proposed device differ from many others wherein the entire space necessarily occupied expands to yield more time delay. Therefore, an advantage of the present invention is that it provides a compact and yet constant dimension, with driving force applied at a fixed location (i.e., head of the screw 260) to adjust delay time.

Another feature of the present design is that it's not mandatory for the optical axis and the mechanical axis to align with each other. As illustrated in FIG. 2B, the light beam propagates along the direction parallel to the optical axis 203, while the precision optical ferrule and optical retroreflector translate along the mechanical axis 204. The optical axis 203 makes an angle of θ to the mechanical axis 204 which is possibly non-zero. When delay time is being adjusted to different values, as demonstrated in FIG. 2B, translational displacement does not change angular orientation of the components, and consequently, the incident angle of the light beam on the optical retroreflector is preserved. What is more, the retroreflector itself is sometimes insensitive to the angle of incidence. Therefore, it's ensured that the incident and reflected beams are precisely parallel. The coupling efficiency may be degraded a bit during tuning because of the drift in the offset between the two beams, but it has a minor impact considering the fact that angular misalignment is the dominant factor compared to lateral misalignment in an optical setup. Note that in this situation, a translational displacement of d along the mechanical axis 204 will cause a change in the optical path length of 2d/cosθ, which approximates to 2d if the angle θ is negligible. In practice, this feature greatly facilitates production of the device since generally the optical portion and mechanical portion are assembled in separate stages, and some uncontrollable situations could occur, such as an inclined retroreflector after being affixed to the ferrule tip, or a tilted beam emerging from the collimator. In this case, it might be overly challenging to ensure their axes are mutually aligned.

A third embodiment of the tunable optical time delay is shown in FIG. 3A and FIG. 3B. A motorized reflection-type fiber-optic time delay device 300 is composed of an optical subassembly 301 and a mechanical subassembly 302 enclosed within a main housing 310. The optical subassembly 301 comprises an optical collimator 320 having an optical fiber pigtail 321, an optical reflector 330, a precision optical ferrule 340, and a precision split sleeve 350. The mechanical subassembly 302 includes a screw 360, a sliding barrel 370, a pin 380, and a transducer 390.

The optical collimator 320 comprises a lens to collimate the input divergent light beam emerging from the optical fiber 321. Examples of lens include convex lens and gradient-index lens. Meanwhile, in the opposite direction the optical collimator 320 also captures returned collimated light beam and couples it into the optical fiber 321 as output. The optical collimator 320 is bonded to the interior of the main housing 310 and located at the edge of the device 300.

The optical reflector 330 is capable of reflecting a collimated beam of light back 180 degrees towards its source when the surface is struck by the beam normally, i.e., the angle of incidence is 0. In general, a reflector is made by applying optical coatings onto a flat substrate. Examples of coating materials include, but are not limited to, aluminum, silver, gold, and a number of dielectric materials.

The precision optical ferrule 340 and precision split sleeve 350 have been extensively used in fiber-optic industry with sub-micron accuracy in diameter and concentricity. They are preferably made of ceramic (especially zirconia), but other materials such as plastic and metal may also be used. The diameter is typically at a millimeter level, for instance, 2.5 mm and 1.25 mm are two of the standard ferrule diameters in the market. The precision optical ferrule 340 is a cylindrical stick with the optical reflector 330 attached to the flat end face at one side. The C-shaped precision split sleeve 350 is a tube coming with an opening slit which allows it to expand, so the precision optical ferrule 340 can be slidably received although the nominal inner diameter of the sleeve is slightly smaller than the outer diameter of the ferrule. The precision split sleeve 350 is bonded to the optical collimator 320 at the edge.

The sliding barrel 370 has thread pitches on the inner surface to match that of the screw 360 coming inwards from one end. The other end is joined with the precision optical ferrule 340 by crimping or other suitable techniques so they can move together. The pin 380 is inserted through the main housing 310 and fits into a slit on the outer surface of the barrel 370, which aims to prevent them from rotating relative to each other. As a result, the motion of the barrel 370 is restricted to translation inside the housing 310 with the range determined by the length of the slit. The transducer 390 is a device used to convert electric signal into motion, such as an electric motor. The transducer 390 installed onto the main housing 310 at the other edge opposing the optical collimator 320 holds the screw 360 in place. Therefore, in contrast to the sliding barrel 370, the screw 360 is rotatable, controlled by the transducer 390, whereas forward and backward translational movements are obstructed. Alternatively, a piezoelectric linear actuator can be used to achieve the same back and forth translational movements.

Referring to FIG. 3A, an input optical signal is launched into the device 300 via the fiber pigtail 321. It's firstly converted into a collimated beam through the optical collimator 320, and then propagates a certain distance L in free space before reaching the optical reflector 330 at an angle of incidence equal to zero. The whole light beam is reflected back thereafter and travels the same distance L along reversed direction towards the optical collimator 320. Eventually, the returned beam of light is coupled into the optical fiber 321 as output. In this way, compared to the input, the output optical signal is delayed primarily by duration of 2L/v, where v is the speed at which light travels through the free space medium. It can be seen that the delay time is a function of L, namely the spacing between the optical collimator 320 and the optical reflector 330. Additionally, it yields a "true" time delay without chromatic dispersion, given that ideally the free space is vacuum and the delay time does not depend on optical frequency.

The mechanical subassembly 302 comes into play to make the spacing L tunable. When the screw 360 is turned by the transducer 390, it starts to rotate relative to the barrel 370 which is threaded onto it, as the barrel is prohibited from rotating together due to the inserted pin 380. This leads to translation between these two components, and since the screw 360 has been locked in place by the transducer 390, instead it is the barrel 370 who is forced to slide at a rate determined by the thread pitch as well as the turning speed. The precision optical ferrule 340 and optical reflector 330 are thus displaced jointly to increase or decrease the spacing L depending on whether the screw is rotated clockwise or counterclockwise. The transducer 390 may even be programmed to modulate the delay time following a specific pattern. In summary, the optical time delay can be tuned via the motorized screw 360 at one end of the device.

The key to maintain optical alignment and minimize optical loss while time delay is varying lies in the usage of the precision optical ferrule 340 and precision split sleeve 350 contained in the optical subassembly 301. Due to manufacturing tolerances which more or less leave a gap between the barrel 370 and the inner wall of the main housing 310, the barrel 370 tends to drift sideways and tilt while sliding. As a result, without the precision optical ferrule 340, the reflector 330 will not move perfectly along a fixed axial direction and the beam's propagation will start to deviate after reflection. For this reason, if optical alignment relies on the mechanical components, strict requirements have to be imposed on the dimensional tolerances in order to keep misalignment acceptably small, which is difficult and costly to achieve. Introducing the precision optical ferrule 340 and precision split sleeve 350 resolves this issue. During the tuning process, the precision optical ferrule 340 slides back and forth within the precision split sleeve 350. As mentioned above, the precision split sleeve 350 is gently enlarged, and the inner wall is elastically deformed. The deformation in turn produces an opposing compressive force against the precision optical ferrule 340, holding it firmly in place despite the movement. Additionally, the precision optical ferrule 340 and precision split sleeve 350 are commercially available with low price and sub-micron precision, which have been massively deployed to support the connection of optical fibers with high stability, reliability and durability. This enables a robust and cost-efficient way to maintain alignment among the optical components. Furthermore, considering their typical dimensions, it's possible to make the entire device compact at millimeter-scale. Therefore, the function of maintaining optical alignment is self-contained in the optical subassembly 301, and the task of the mechanical subassembly 302 becomes driving the translational motion only.

It should be noted that the effective exterior dimension of the device remains unaltered during tuning process. With the above design, the total length enclosing all the operating components spans from the motorized screw 360 to the optical collimator 320, both of which are fixed at particular positions regardless of how the barrel 370, precision optical ferrule 340 and optical reflector 330 move in between. This makes the proposed device differ from many others wherein the entire space necessarily occupied expands to yield more time delay. Therefore, an advantage of the present invention is that it provides a compact and yet constant dimension, with driving power applied at a fixed location (i.e., the transducer 390) to adjust delay time.

Another feature of the present design is that it's not mandatory for the optical axis and the mechanical axis to align with each other. As illustrated in FIG. 3B, the light beam propagates along the direction parallel to the optical axis 303, while the precision optical ferrule and optical reflector translate along the mechanical axis 304. The optical axis 303 makes an angle of θ to the mechanical axis 304 which is possibly non-zero. When delay time is being adjusted to different values, as demonstrated in FIG. 3B, translational displacement does not change angular orientation of the components, and consequently, the incident angle of the light beam on the optical reflector is preserved at zero. As long as the beam arrives within the clear aperture of the optical reflector, the device still works without performance degradation. Note that in this situation, a translational displacement of d along the mechanical axis 304 will cause a change in the optical path length of 2d/cosθ, which approximates to 2d if the angle θ is negligible. In practice, this feature greatly facilitates production of the device since generally the optical portion and mechanical portion are assembled in separate stages, and some uncontrollable situations could occur, such as an inclined reflector after being affixed to the ferrule tip, or a tilted beam emerging from the collimator. In this case, it might be overly challenging to ensure their axes are mutually aligned.

A fourth embodiment of the tunable optical time delay is shown in FIG. 4A and FIG. 4B. A 1×1 transmission-type motorized fiber-optic time delay device 400 is composed of an optical subassembly 401 and a mechanical subassembly 402 enclosed within a main housing 410. The optical subassembly 401 comprises an optical collimator 420 having a first optical fiber pigtail 421 and a second optical fiber pigtail 422, an optical retroreflector 430, a precision optical ferrule 440, and a precision split sleeve 450. The mechanical subassembly 402 includes a screw 460, a sliding barrel 470, a pin 480, and a transducer 490.

The optical collimator 420 comprises a lens to collimate the input divergent light beam emerging from the first optical fiber 421. In the opposite direction, the optical collimator 420 also uses a lens to capture a returned collimated light beam and couple it into the second optical fiber 422 as output. Examples of lens include convex lens and gradient-index lens. Additionally, the emitted beam from the first optical fiber 421 and the received beam into the second optical fiber 422 are parallel, which can be accomplished with various optical setups. In one example illustrated in FIG. 5A, two individual lenses 501 and 502 are assigned to each optical fiber. In another configuration illustrated in FIG. 5B, the two optical fibers share the same collimating lens 503 followed by a customized roof prism 504 for beam steering. The optical collimator 420 is bonded to the interior of the main housing 410 and located at the edge of the device 400.

The optical retroreflector 430 is capable of reflecting a collimated beam of light back 180 degrees towards its original direction but along a different path. Unlike a planar mirror, sometimes a retroreflector works at a wide range of incident angles rather than just exactly zero. A variety of designs and structures are available such as hollow roof mirrors, hollow cone mirrors and corner cube prisms. Alternatively, as shown in FIG. 6, the retroreflector can be constructed using a lens 601, which focuses the incident beam onto an optical mirror 602 to reflect the light. Examples of lens are gradient index lens and C-lens. In general, a retroreflector is made by applying optical coatings onto its surfaces, with the materials include, but are not limited to, aluminum, silver, gold, and a number of dielectric materials.

The precision optical ferrule 440 and precision split sleeve 450 have been extensively used in fiber-optic industry with sub-micron accuracy in diameter and concentricity. They are preferably made of ceramic (especially zirconia), but other materials such as plastic and metal may also be used. The diameter is typically at a millimeter level, for instance, 2.5 mm and 1.25 mm are two of the standard ferrule diameters in the market. The precision optical ferrule 440 is a cylindrical stick with the optical retroreflector 430 attached to the flat end face at one side. The C-shaped precision split sleeve 450 is a tube coming with an opening slit which allows it to expand, so the precision optical ferrule 440 can be slidably received although the nominal inner diameter of the sleeve is slightly smaller than the outer diameter of the ferrule. The precision split sleeve 450 is bonded to the optical collimator 420 at the edge.

The sliding barrel 470 has thread pitches on the inner surface to match that of the screw 460 coming inwards from one end. The other end is joined with the precision optical ferrule 440 by crimping or other suitable techniques so they can move together. The pin 480 is inserted through the main housing 410 and fits into a slit on the outer surface of the barrel 470, which aims to prevent them from rotating relative to each other. As a result, the motion of the barrel 470 is restricted to translation inside the housing 410 with the range determined by the length of the slit. The transducer 490 is a device used to convert electric signal into motion, such as an electric motor. The transducer 490 installed onto the main housing 410 at the other edge opposing the optical collimator 420 holds the screw 460 in place. Therefore, in contrast to the sliding barrel 470, the screw 460 is rotatable, controlled by the transducer 490, whereas forward and backward translational movements are obstructed. Alternatively, a piezoelectric linear actuator can be used to achieve the same back and forth translational movements.

Referring to FIG. 4A, an input optical signal is launched into the device 400 via the first fiber pigtail 421. It's firstly converted into a collimated beam through the optical collimator 420, and then propagates a certain distance L in free space before reaching the optical retroreflector 430. The whole light beam is reflected back thereafter and travels the same distance L along reversed direction towards the optical collimator 420. Eventually, the returned beam of light is coupled into the second optical fiber 422 as output. In this way, compared to the input, the output optical signal is delayed primarily by duration of 2L/v, where v is the speed at which light travels through the free space medium. It can be seen that the delay time is a function of L, namely the spacing between the optical collimator 420 and the optical retroreflector 430. Additionally, it yields a "true" time delay without chromatic dispersion, given that ideally the free space is vacuum and the delay time does not depend on optical frequency.

The mechanical subassembly 402 comes into play to make the spacing L tunable. When the screw 460 is turned by the transducer 490, it starts to rotate relative to the barrel 470 which is threaded onto it, as the barrel is prohibited from rotating together due to the inserted pin 480. This leads to translation between these two components, and since the screw 460 has been locked in place by the transducer 490, instead it is the barrel 470 who is forced to slide at a rate determined by the thread pitch as well as the turning speed. The precision optical ferrule 440 and optical retroreflector 430 are thus displaced jointly to increase or decrease the spacing L depending on whether the screw is rotated clockwise or counterclockwise. The transducer 490 may even be programmed to modulate the delay time following a specific pattern. In summary, the optical time delay can be tuned via the motorized screw 460 at one end of the device.

The key to maintain optical alignment and minimize optical loss while time delay is varying lies in the usage of the precision optical ferrule 440 and precision split sleeve 450 contained in the optical subassembly 401. Due to manufacturing tolerances which more or less leave a gap between the barrel 470 and the inner wall of the main housing 410, the barrel 470 tends to drift sideways and tilt while sliding. As a result, without the precision optical ferrule 440, the retroreflector 430 will not move perfectly along a fixed axial direction and the beam's propagation will start to deviate after reflection. For this reason, if optical alignment relies on the mechanical components, strict requirements have to be imposed on the dimensional tolerances in order to keep misalignment acceptably small, which is difficult and costly to achieve. Introducing the precision optical ferrule 440 and precision split sleeve 450 resolves this issue. During the tuning process, the precision optical ferrule 440 slides back and forth within the precision split sleeve 450. As mentioned above, the precision split sleeve 450 is gently enlarged, and the inner wall is elastically deformed. The deformation in turn produces an opposing compressive force against the precision optical ferrule 440, holding it firmly in place despite the movement. Additionally, the precision optical ferrule 440 and precision split sleeve 450 are commercially available with low price and sub-micron precision, which have been massively deployed to support the connection of optical fibers with high stability, reliability and durability. This enables a robust and cost-efficient way to maintain alignment among the optical components. Furthermore, considering their typical dimensions, it's possible to make the entire device compact at millimeter-scale. Therefore, the function of maintaining optical alignment is self-contained in the optical subassembly 401, and the task of the mechanical subassembly 402 becomes driving the translational motion only.

It should be noted that the effective exterior dimension of the device remains unaltered during tuning process. With the above design, the total length enclosing all the operating components spans from the motorized screw 460 to the optical collimator 420, both of which are fixed at particular positions regardless of how the barrel 470, precision optical ferrule 440 and optical retroreflector 430 move in between. This makes the proposed device differ from many others wherein the entire space necessarily occupied expands to yield more time delay. Therefore, an advantage of the present invention is that it provides a compact and yet constant dimension, with driving power applied at a fixed location (i.e., the transducer 490) to adjust delay time.

Another feature of the present design is that it's not mandatory for the optical axis and the mechanical axis to align with each other. As illustrated in FIG. 4B, the light beam propagates along the direction parallel to the optical axis 403, while the precision optical ferrule and optical retroreflector translate along the mechanical axis 404. The optical axis 403 makes an angle of θ to the mechanical axis 404 which is possibly non-zero. When delay time is being adjusted to different values, as demonstrated in FIG. 4B, translational displacement does not change angular orientation of the components, and consequently, the incident angle of the light beam on the optical retroreflector is preserved. What is more, the retroreflector itself is sometimes insensitive to the angle of incidence. Therefore, it's ensured that the incident and reflected beams are precisely parallel. The coupling efficiency may be degraded a bit during tuning because of the drift in the offset between the two beams, but it has a minor impact considering the fact that angular misalignment is the dominant factor compared to lateral misalignment in an optical setup. Note that in this situation, a translational displacement of d along the mechanical axis 404 will cause a change in the optical path length of $2d/\cos\theta$, which approximates to 2d if the angle θ is negligible. In practice, this feature greatly facilitates production of the device since generally the optical portion and mechanical portion are assembled in separate stages, and some uncontrollable situations could occur, such as an inclined retroreflector after being affixed to the ferrule tip, or a tilted beam emerging from the collimator. In this case, it might be overly challenging to ensure their axes are mutually aligned.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A compact tunable optical time delay device, comprising:
    a high-precision optical subassembly comprising:
        an optical collimator;
        an optical reflector;

a precision optical ferrule; and
a precision split sleeve;
a mechanical subassembly comprising:
  a screw;
  a sliding barrel;
  a pin; and
  a position clamp; and
a self-contained body housing,
wherein, with an input optical signal launched into the optical collimator which is bonded to one end of the precision split sleeve wrapping around the precision optical ferrule, a collimated beam emerges out of the optical collimator, travels a distance, and is reflected backwards by the optical reflector, which is attached to an end face of the precision optical ferrule, to exit through the optical collimator,
wherein, a generated optical delay time is determined by an optical path length traveled by the beam between the optical collimator and the optical reflector, and
wherein the mechanical subassembly is configured such that, when the screw is rotated, the sliding barrel moves along a translational direction to drive a motion of the precision optical ferrule as well as the optical reflector to adjust the optical path length.

2. The compact tunable optical time delay assembly of claim 1, wherein the optical collimator comprises a convex lens.

3. The compact tunable optical time delay assembly of claim 1, wherein the optical collimator comprises a gradient-index lens.

4. The compact tunable optical time delay assembly of claim 1, wherein the precision optical ferrule comprises a ceramic ferrule.

5. The tunable optical time delay assembly of claim 1, wherein the precision optical ferrule comprises a metal ferrule.

6. The compact tunable optical time delay assembly of claim 1, wherein the precision optical ferrule comprises a plastic ferrule.

7. The compact tunable optical time delay assembly of claim 1, wherein the precision split sleeve comprises a ceramic split sleeve.

8. The compact tunable optical time delay assembly of claim 1, wherein the precision split sleeve comprises a metal split sleeve.

9. The compact tunable optical time delay assembly of claim 1, wherein the precision split sleeve comprises a plastic split sleeve.

10. The compact tunable optical time delay assembly of claim 1, wherein the precision split sleeve is enlargeable by the precision optical ferrule such that an elastic force arises to hold the precision optical ferrule firmly during movement.

11. The compact tunable optical time delay assembly of claim 1, wherein the screw, the position clamp and the self-contained body housing are configured such that the screw rotates in place without forward and backward translational movements.

12. The compact tunable optical time delay assembly of claim 1, wherein the sliding barrel, the pin and the self-contained body housing are configured such that the barrel moves linearly.

13. The compact tunable optical time delay assembly of claim 1, wherein the sliding barrel is threaded onto the screw at one end and joined with the precision optical ferrule at an opposite end.

14. The compact tunable optical time delay assembly of claim 1, wherein a spacing between the optical collimator and the optical reflector is free space.

15. The compact tunable optical time delay assembly of claim 1, wherein the optical collimator and the screw are fixed in place such that a total effective dimension occupied by the assembly is constant at any moment during delay adjustment.

16. The compact tunable optical time delay assembly of claim 1, wherein an optical axis along which the input optical signal travels and a mechanical axis along which the ferrule slides are aligned in an angle.

17. The compact tunable optical time delay assembly of claim 1, wherein the optical collimator has a first optical fiber configured as an input and a second optical fiber configured as an output.

18. The compact tunable optical time delay assembly of claim 17, wherein the collimated beam emitted out of the optical collimator and the collimated beam received by the optical collimator are parallel.

19. The compact tunable optical time delay assembly of claim 17, wherein the optical collimator has two lenses comprising a first lens corresponding to the first optical fiber and a second lens corresponding to the second optical fiber.

20. The compact tunable optical time delay assembly of claim 17, wherein the optical collimator comprises a single lens and a prism.

21. The compact tunable optical time delay assembly of claim 17, wherein the optical reflector comprises a hollow roof mirror.

22. The compact tunable optical time delay assembly of claim 17, wherein the optical reflector comprises a hollow cone mirror.

23. The compact tunable optical time delay assembly of claim 17, wherein the optical reflector comprises a corner cube prism.

24. The compact tunable optical time delay assembly of claim 17, wherein the optical reflector comprises a lens and an optical mirror.

25. The compact tunable optical time delay assembly of claim 1, wherein the mechanical subassembly comprises a motorized linear actuator.

26. The compact tunable optical time delay assembly of claim 1, wherein the mechanical subassembly comprises a motorized linear actuator.

* * * * *